US000001192H

United States Statutory Invention Registration [19]

[11] Reg. Number: H1192

Keller

[43] Published: Jun. 1, 1993

[54] LOW-TORQUE CENTRALIZER

[75] Inventor: Stuart R. Keller, Houston, Tex.

[73] Assignee: Exxon Production Research Company, Houston, Tex.

[21] Appl. No.: 750,847

[22] Filed: Aug. 27, 1991

Related U.S. Application Data

[63] Continuation-in-part of Ser. No. 603,652, Oct. 26, 1990.

[51] Int. Cl.[5] ..... E21B 17/10

[52] U.S. Cl. ..... 166/241.6

[58] Field of Search ..... 166/241.6, 241.3; 175/325.3; 384/273, 281, 321, 316

[56] References Cited

U.S. PATENT DOCUMENTS

| | | | |
|---|---|---|---|
| 1,566,451 | 12/1925 | Vaughn | 175/325 |
| 1,820,391 | 8/1931 | Hartman | 166/241 |
| 2,145,336 | 1/1939 | Boyd | 166/241 |
| 3,062,297 | 11/1962 | Tyrrell, Jr. | 166/241 |
| 3,282,344 | 11/1966 | Tripplehorn | 166/172 |
| 3,343,890 | 9/1967 | Homer | 308/4 |
| 3,414,337 | 12/1968 | Sable | 308/4 |
| 3,578,084 | 11/1971 | Bombardieri et al. | 166/241 X |
| 3,933,203 | 1/1976 | Evans | 166/241 |
| 3,991,850 | 11/1976 | Escaron | 166/241 X |
| 4,004,326 | 1/1977 | Beavers | 24/81 |
| 4,071,101 | 1/1978 | Ford | 175/325 |
| 4,083,612 | 4/1978 | Olson | 175/325.3 |
| 4,448,248 | 5/1984 | Schwind | 166/241 |
| 4,483,395 | 11/1984 | Kramer | 166/241 |
| 4,506,219 | 3/1985 | Lee | 324/221 |
| 4,651,823 | 3/1987 | Spikes | 166/241 |
| 4,657,090 | 4/1987 | Geczy | 175/107 X |
| 4,658,896 | 4/1987 | Milam | 166/241 |
| 4,757,861 | 7/1988 | Klyne | 166/241 |
| 4,787,448 | 11/1988 | Sable | 166/176 |
| 4,858,688 | 8/1989 | Edwards et al. | 166/241 |
| 4,974,691 | 12/1990 | Leaney et al. | 166/241 |
| 4,988,217 | 1/1991 | Iijima | 384/273 |

FOREIGN PATENT DOCUMENTS

| | | | |
|---|---|---|---|
| 140311 | 5/1985 | European Pat. Off. . | |
| 248615 | 12/1987 | European Pat. Off. . | |
| 1017112 | 10/1957 | Fed. Rep. of Germany | 166/241 |
| 2542367 | 7/1984 | France | 166/241 |
| 2554160 | 5/1985 | France | 166/241 |

OTHER PUBLICATIONS

"An Investigation of Oil Well Cementing", Drill. & Prod. Prac., API (1946) 76, Teplitz et al, pp. 76–103.

"Factors to be Considered in Obtaining Proper Cementing of Casing", Drill. & Prod., API (1948) 256, Howard et al, pp. 257–272.

"Displacement Mechanics in Primary Cementing", J. Pet. Tech., (Feb., 1967) 251, McLean et al, pp. 251–260.

"Linear Rotation While Cementing: An Operator's Experience South Texas", SPE Prod. Eng. (Mar. 1986) 153, Arceneaux et al, pp. 153–159.

Turbeco Inc., Advertisement Publication, p. 2.

Chimo, Advertisement Publication, p. 3.

"Rotation of a Long Liner in a Shallow Long-Reach Well", J. Pet. Tech. (Apr., 1989) 401, Gust et al, pp. 401–404.

*Primary Examiner*—David H. Brown

*Attorney, Agent, or Firm*—Keith A. Bell

[57] ABSTRACT

An improvement to a centralizer that may reduce the torque required to rotate a casing in a borehole during primary cementing is disclosed. In a first embodiment, the improvement is adapted to a bow spring type centralizer having intermediate fixed and slidable sleeves with each sleeve circumscribed by an end band. The end bands are connected to each other by a plurality of bow springs. The improvement includes interposing a sleeve bearing between each end band and its respective intermediate sleeve. The sleeve bearings may be attached to the intermediate sleeves to permit their rotation with the casing relative to the stationary end bands and bow springs. Alternatively, the intermediate sleeves may be eliminated and the sleeve bearings interposed directly between the outer surface of the casing and inner surfaces of their respective end bands.

21 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW-TORQUE CENTRALIZER

RELATED APPLICATION

This application is a continuation-in-part application of co-pending application Ser. No. 603,652 filed on Oct. 26, 1990.

BACKGROUND OF INVENTION

1. Field of Invention

This invention relates to an improved oil well casing centralizer. More particularly, but not by way of limitation, the invention pertains to a device for reducing the torque required to rotate a casing positioned in a borehole during primary cementing of the casing.

2. Description of Prior Art

In completing oil or gas wells, the borehole is usually lined with a steel pipe (known as a "casing" or a "liner") held in place by cement located in the annular area between the casing's outer surface and the borehole wall. Typically, centralizers are used to center the casing in the borehole during cementing. A centered casing ensures a cement column of substantially uniform thickness and reduces channeling of the cement (discussed below).

One type of centralizing device is a bow spring centralizer. A typical bow spring centralizer is comprised of a fixed sleeve, a slidable sleeve, and a plurality of longitudinal bow springs extending therebetween. The fixed and slidable sleeves circumscribe the casing while the flexible bow springs are bowed outwardly to contact the borehole wall. As is well known in the art, longitudinal movement of the slidable sleeve is used to vary the amount of curvature of the bow springs. The centralizer, thereby, is able to substantially center the casing in the borehole despite variations in borehole diameter. Once centered, the casing may be cemented in place by pumping a column of cement into the annular space between the casing and borehole wall.

One type of cementing employed in oil and gas well completion is primary cementing. Primary cementing occurs immediately after the casing is run into the borehole. Its purpose is to provide a protective sheath around the casing and to prevent production of undesired fluids from strata above or below the zone of interest.

A problem frequently encountered in primary cementing is channeling of the cement. Such channeling arises from the cement slurry's inability to completely displace the drilling mud which surrounds the casing. Typically, a cement slurry is pumped down through the casing and then up the annulus to displace the drilling mud from the casing/borehole annulus. Mud channels develop when portions of drilling mud are not displaced by the cement. This is sometimes caused by the casing not being well centered in the borehole. Under such circumstances, it is difficult for the cement to displace the drilling fluid from the narrow side of the casing-/borehole annulus. The undisplaced drilling mud may then later be displaced by water (or gas) from a surrounding reservoir through one or more of the production perforations. The channel thereby causes the production of unwanted fluid. This channeling effect has been well documented in field and laboratory studies including "An Investigation of Oil Well Cementing", *Drill. & Prod. Prac.*, API (1946) 76, Teplitz, A. J. and Hassebrock, W. E. and "Factors to be Considered in Obtaining Proper Cementing of Casing", *Drill. & Prod. Prac.*, API (1948) 257, Howard, G. C. and Clark, J. B.

A second type of cementing is remedial or squeeze cementing, which is used to repair the primary cement sheath. Such cementing involves injecting cement behind the casing to recement channeled areas or to block off an uncemented zone. Eliminating or minimizing cement channeling facilitates primary cementing. Improved primary cementing in turn helps prevent lost hydrocarbons through interzonal flow, minimizes production of unwanted fluids, and reduces remedial cementing costs.

A variety of techniques for preventing or minimizing the channeling effect are known. These techniques generally focus on some method for improving the displacement of drilling mud by the cement slurry. "Displacement Mechanics in Primary Cementing" *J. Pet. Tech.* (Feb., 1967) 251, McLean, R. H. et al. identifies casing movement as one technique for improving mud displacement. Moreover, McLean recommends casing rotation as the preferred means of moving the casing. Subsequent studies confirming improvement in primary cementing from casing rotation include, "Liner Rotation While Cementing: An Operator's Experience South Texas", *SPE Prod. Eng.* (March, 1986) 153, Arceneaux, M. A., Smith, R. L. and "Rotation of a Long Liner in a Shallow Long-Reach Well", *J. Pet. Tech.* (April, 1989) 401, Gust, D. A., MaCDonald, R. R.

With a typical centralizer, a casing may rotate within the centralizer while bands or stop rings, rigidly attached to the casing's outside diameter, prevent the centralizer from moving longitudinally along the casing. High torque, however, is usually required to rotate a casing positioned by one or more centralizers in a borehole. The coefficient of friction produced by the contact of steel casing with a centralizer's steel sleeves necessarily requires significant torque at the surface to overcome the static and kinetic frictional forces. In some cases, the required torque at the surface may exceed the capacity of the drilling rig. In other cases, high-cost casing connections with high-torque capacity are required where casing rotation is desired and static and kinetic frictional forces are high. The proposed invention reduces the torque required to rotate a centralized casing during primary cementing which may facilitate rotation with available equipment and/or allow using lower-torque connections having lower cost.

Some previous patents have suggested a variety of means for reducing static and kinetic frictional forces in rotating various types of drilling apparatus. None of these patents, however, recognize the problems posed by small clearances between the casing and borehole wall, nonuniform wear caused by lateral loads on the bearing surfaces, or increased friction and deterioration of the bearing surfaces caused by particles and debris in the drilling fluid.

In European Patent 140311, E. O. Anders discloses an apparatus for reducing friction resisting rotation of a drill string in inclined well bores. The apparatus includes a rigid tubular body adapted to connect to a drill string and a sleeve of elastomeric material loosely mounted on the tubular body. The apparatus allows rotation of the drill string and tubular body relative to the elastomeric sleeve which contacts the borehole wall or casing. This rotation thereby occurs with less frictional resistance than would be produced by a drill string rotating against the borehole wall or casing in the absence of such an apparatus. Anders, however, does not suggest any means for adapting the elastomeric material to a bow spring type centralizer. Furthermore, in Anders' apparatus, the drill string rotates inside a stationary elastomer bearing. In deviated wells, this will result in uneven wear and therefore reduced bearing life.

The bow spring centralizer is preferable to the rigid centralizer described by Anders where the borehole diameter varies. Borehole diameter variations can arise where a tapered casing string is used, where casing wall thicknesses may vary for tensile or pressure designs purposes, or where borehole washout has occurred at deeper depths. Borehole washout is where the diameter of the borehole is greater than the diameter of the bit used to drill it. This is caused by the erosional effect of the circulating drilling fluid or by spalling or caving in of unstable formations. This phenomenon frequently occurs in well drilling and is well known to those skilled in the art. As described above, the bow spring centralizer can either contract or expand its outside diameter to adapt to a range of borehole diameters that may be found in a single borehole. A rigid centralizer, however, has a fixed outside diameter which must not exceed the minimum inner diameter of any previously-run casing.

If the elastomeric bearing surface is stationary, as in Anders' apparatus, it will wear unevenly in deviated wells where the side loads on the bearing act predominantly toward one side (usually the low side) of the hole. This will result in reduced bearing life, which becomes a greater concern if clearance considerations limit bearing thicknesses.

Consequently, a need exists for an improved bow spring type centralizer which reduces the torque required to rotate the casing positioned in a borehole during primary cementing. This improvement should be easily and economically incorporated into such a centralizer without reducing the centralizer's adaptability to various borehole diameters. Also, the improvement should facilitate extended rotation times by providing for even wear of the principal bearing surface.

SUMMARY OF INVENTION

This invention relates generally to an improved centralizer that may reduce the torque required to rotate a casing in a borehole during primary cementing. Specifically, the centralizer is comprised of a fixed sleeve and a slidable sleeve each circumscribing the casing with a plurality of longitudinal bow springs spaced around the casing. The bow springs extend between the fixed and slidable sleeves and are rigidly attached to an end band circumscribing each sleeve. The fixed sleeve is rigidly attached to the casing while the the slidable sleeve is adapted to longitudinally slide along the casing. The slidable sleeve's movement allows each longitudinal bow spring, formed in an outwardly bowed arc, to adjust its maximum radial offset from the casing in order to adapt to variations in borehole diameter. The reduced torque is achieved by interposing a special sleeve bearing between each of the end bands and its respective fixed or slidable sleeve. These sleeve bearings, which are preferably made of a polymeric material such as teflon, reduce the friction when rotating the casing with respect to the end bands.

In an alternative embodiment of this invention, the fixed and slidable inner sleeves are eliminated. A sleeve bearing is interposed between each of the centralizer's end bands and the casing so as to facilitate rotation of the casing. Preferably, the sleeve bearing is adapted to rotate with the casing while the centralizer end bands remain substantially stationary. This promotes even wear of the bearing surface and prolongs the useful life of the invention. The sleeve bearing itself may include radially outwardly extending end flanges which capture the end band and ensure that the sleeve bearing remains inside the end band when it moves longitudinally along the casing. In this case, a longitudinal slit or "scarf cut" in the sleeve bearing may be used to facilitate insertion of the sleeve bearing into the end band. The sleeve bearing is preferably made of a polymeric material such as polyethylene, polytetrafluoroethylene, polyurethane, or nylon.

Alternatively, an extended length sleeve bearing may be firmly attached to the casing with an adhesive. In this case, the length of the sleeve bearing would be sufficient to extend over the entire longitudinal "travel" of the end band.

BRIEF DESCRIPTION OF THE DRAWINGS

The actual operation of the proposed invention will be better understood by referring to the following detailed description and the attached drawings in which.

DESCRIPTION OF PREFERRED EMBODIMENT

Figure 1:
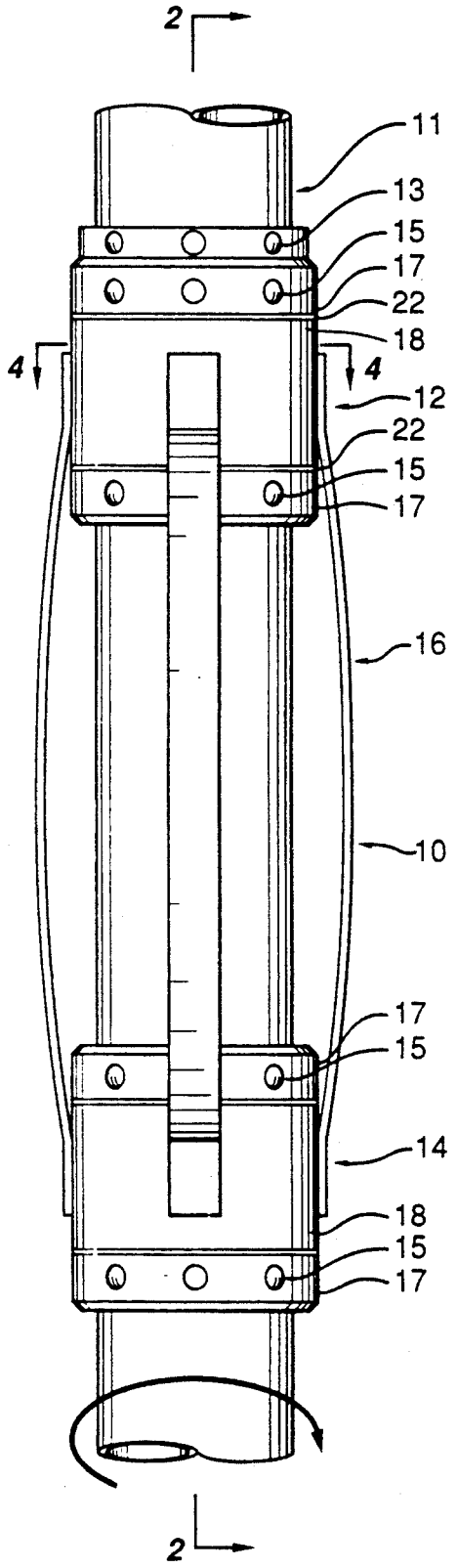
FIG. 1 illustrates an improved bow spring type casing centralizer in accordance with the present invention positioned on a section of casing.

Referring to FIG. 1 a bow spring type centralizer 10 with a fixed sleeve 12 and slidable sleeve 14 is shown positioned on a section of casing 11. The slidable sleeve 14 may move longitudinally along the casing 11 in order to adjust the amount of curvature of the bow springs.

Thus, the centralizer is able to adapt to variations in the borehole's diameter.

Figure 2:
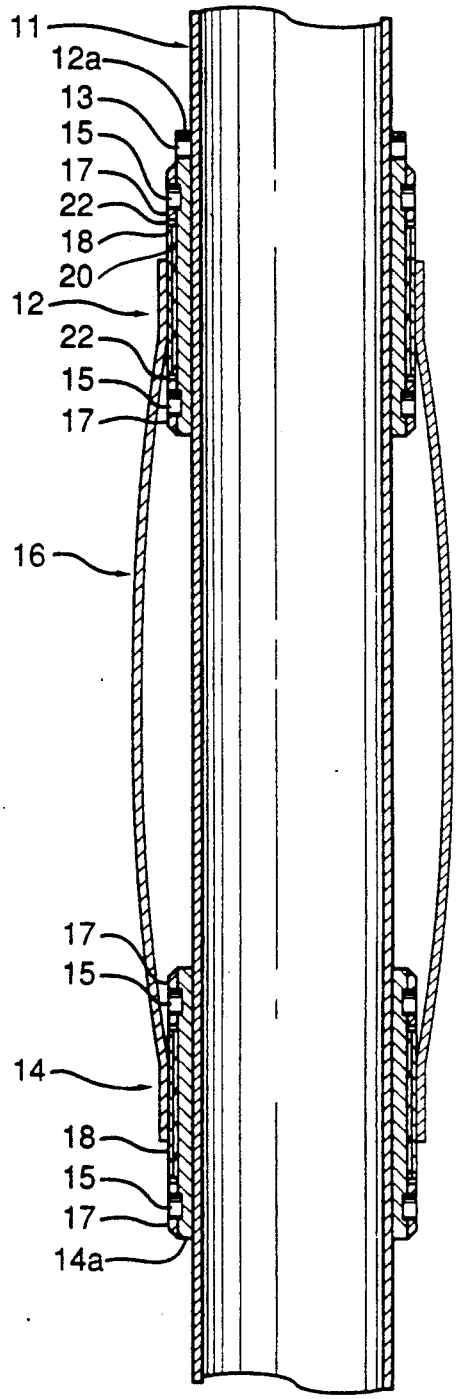
FIG. 2 is a cross-sectional view of the improved bow spring type centralizer taken along line 2—2 of FIG. 1.
Figure 3:
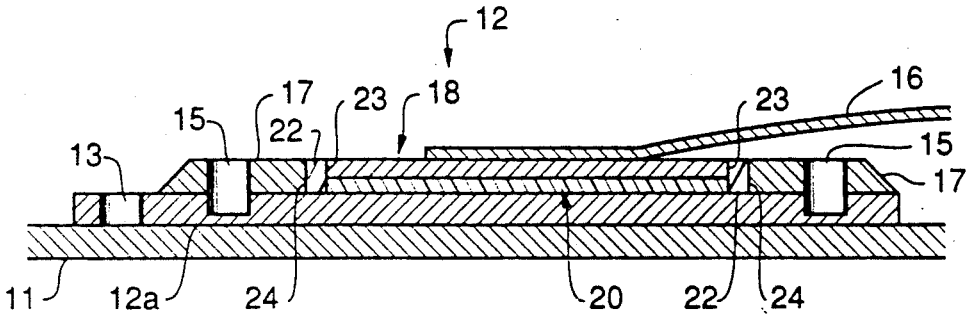
FIG. 3 is an enlarged cross-sectional view of the fixed sleeve, sleeve bearing, and end band with bow spring attached taken along line 2—2 of FIG. 1.

As illustrated in FIG. 3, fixed sleeve 12 preferably comprises an inner sleeve 12*a* which is attached to the casing 11 by set screws 13, two end caps 17 which are attached to inner sleeve 12*a* by screws 15, a sleeve bearing 20, two thrust bearings 22, and end band 18 to which the end of each bow spring 16 is attached. Slidable sleeve 14 is preferably identical to fixed sleeve 12, except that inner sleeve 14*a* (see FIG. 2) is not attached to casing 11. Rather, inner sleeve 14*a* is permitted to slide longitudinally along casing 11.

The longitudinal bow springs 16 extend between each sleeve and are attached at each end band 18 which circumscribes its respective sleeve. The bow springs 16 form an outwardly bowed arc so that preferably at least some portion of each bow spring 16 contacts the borehole wall (not shown).

As seen in FIGS. 2 and 3, an end band 18 circumscribes each inner sleeve 12*a*, 14*a*. A sleeve bearing 20 is fitted between each end band 18 and its respective inner sleeve 12*a*, 14*a*. The sleeve bearings 20 are preferably comprised of a polymer such as polytetrafluoroethylene (PTFE), polyethylene (PE), polyurethane or nylon. These sleeve bearings 20 thereby reduce the torque required to rotate the casing 11 relative to the end bands 18 which are held in a relatively fixed position by the attached bow springs 16 contacting the borehole wall (not shown).

Preferably sleeve bearing 20 is fixed to inner sleeve 12*a*, 14*a* such that rotation occurs between the outer surface of the sleeve bearing 20 and the inner surface of end band 18. With this construction, the polymer sleeve bearings 20 will rotate relative to the stationary end bands 18 thereby causing even wear of the polymer material. Further friction reduction might be achieved by polishing the inner surface of the centralizer end bands 18 or by lining the centralizer end bands 18 with a friction reducing material such as PTFE, PE, polyurethane or nylon.

Additionally, FIGS. 2 and 3 illustrate the end caps 17 used to prevent the longitudinal movement of the end bands 18 with respect to the sleeves 12, 14. Two end caps 17 circumscribe each sleeve 12, 14 and are attached to their respective sleeve's surface by screws 15 at various points around the end cap (see FIG. 1). The end caps 17 also form the channel circumscribing the fixed sleeve 12 and slidable sleeve 14 in which their respective polymer thrust bearings 22, sleeve bearing 20, and end band 18 are mounted. Using screws 15 (or some similar means) to attach the end caps 17 to their respective sleeves 12, 14 permits the centralizer to 10 to be broken down for ease of assembly. Alternatively, a shoulder (not shown) formed integrally with each inner sleeve 12*a*, 14*a* may be substituted for the end cap located at the outer ends of each sleeve 12, 14.

Use of a polymer thrust bearing 22 is preferred to reduce frictional forces that arise between each end band 18 and its respective end caps 17. FIG. 3 shows how polymer thrust bearings 22 circumscribing the inner sleeve 12*a* may be placed between edge 23 of the end band 18 and the edge 24 of the end cap 17. Polymer thrust bearings 22 may be adapted to the slidable sleeve 14 (see FIG. 2) in likewise fashion.

Figure 4:
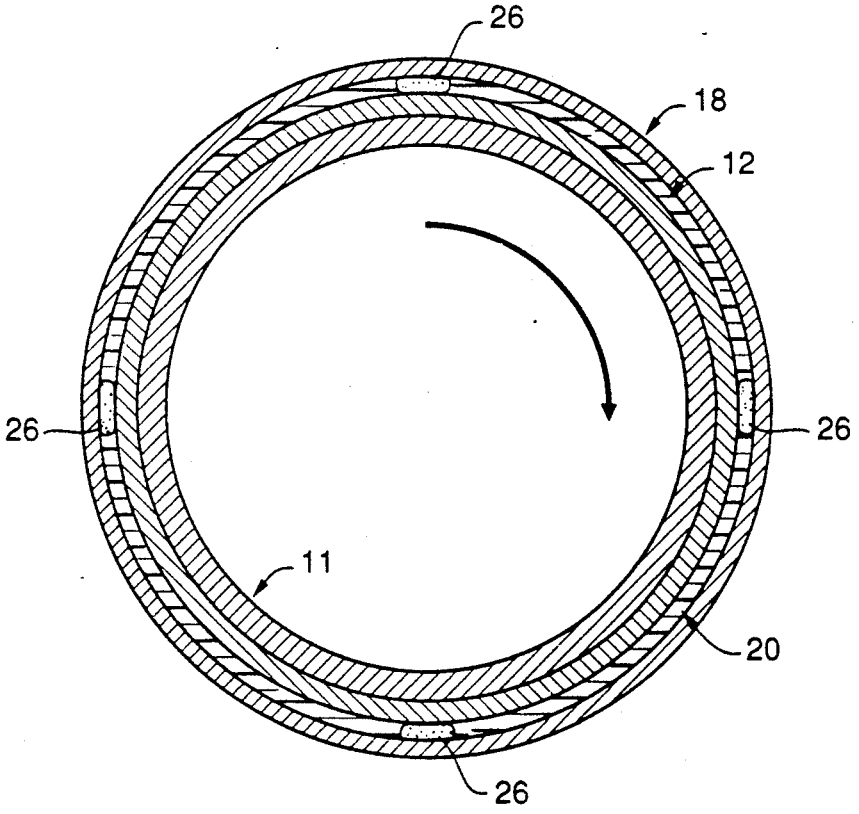
FIG. 4 is a cross-sectional view of the improved bow spring type centralizer taken along line 4—4 of FIG. 1 and illustrating the use of mud grooves in the sleeve bearing.

Referring to FIG. 4, a plurality of mud grooves 26 running longitudinally along each sleeve bearing 20 would serve to trap solid particles and debris which may make their way between the end band 18 and sleeve bearing 20 surfaces. By trapping these particles, the mud grooves 26 would help protect the sleeve bearing 20 surface and preserve its friction-reducing properties. Small particles (e.g., barite fines), however, may become embedded in a polymer sleeve bearing 20 without significantly reducing the sleeve's effectiveness in minimizing the torque required to rotate the centralized casing 11.

Figure 5:
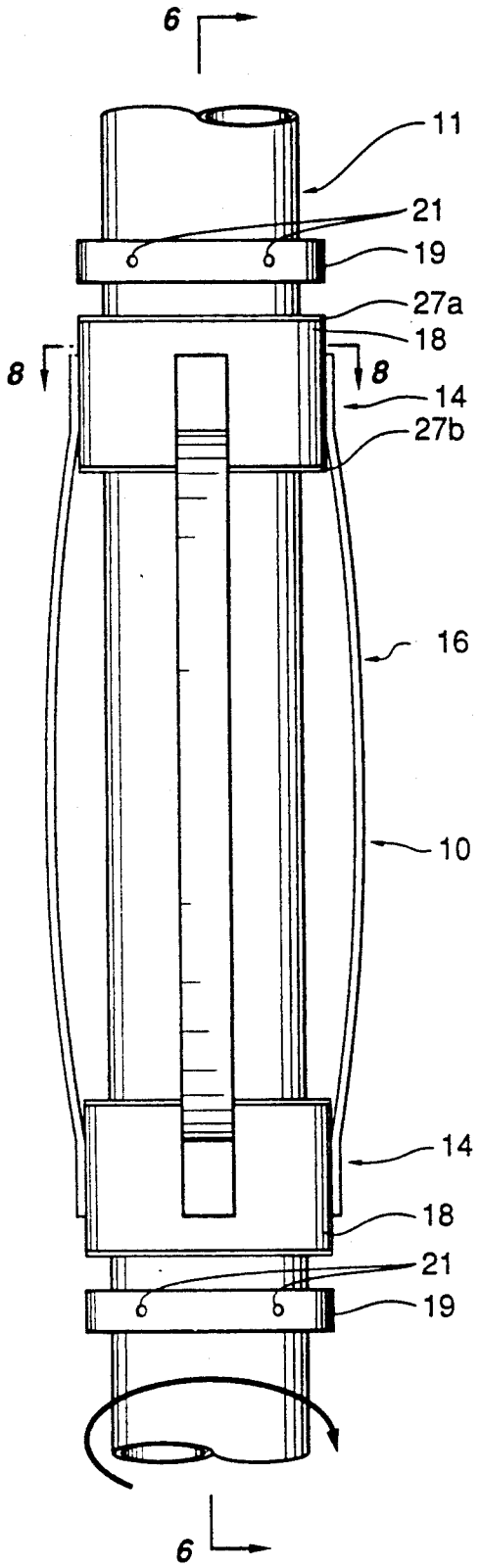
FIG. 5 illustrates a first alternative embodiment of the improved bow spring type centralizer which utilizes a slit sleeve bearing.
Figure 6:
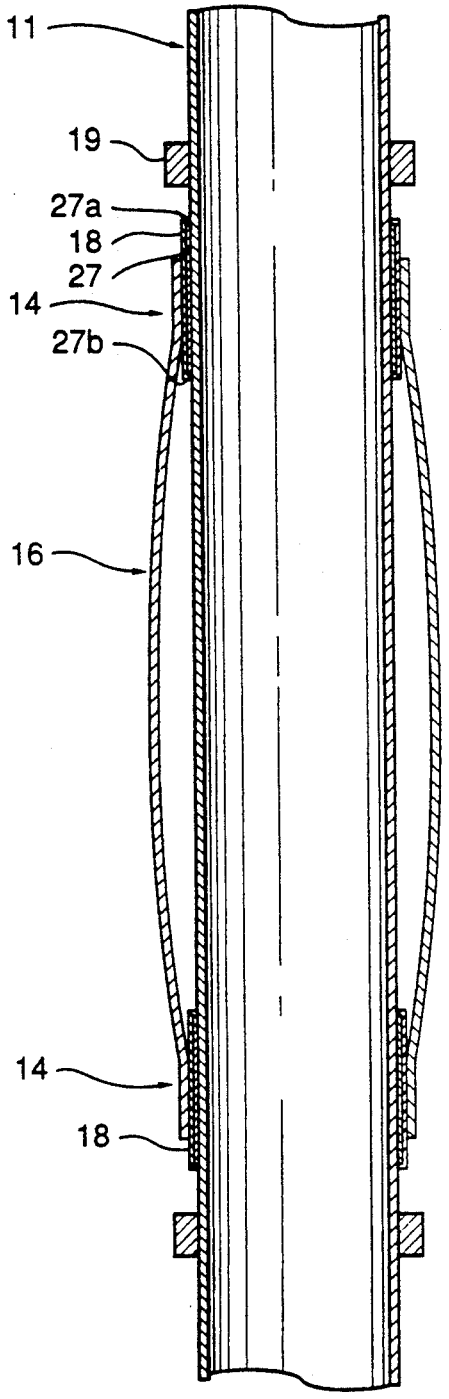
FIG. 6 is a cross-sectional view of the alternative embodiment of the improved bow spring type centralizer illustrated in FIG. 5 taken along line 6—6 of FIG. 5.
Figure 7:
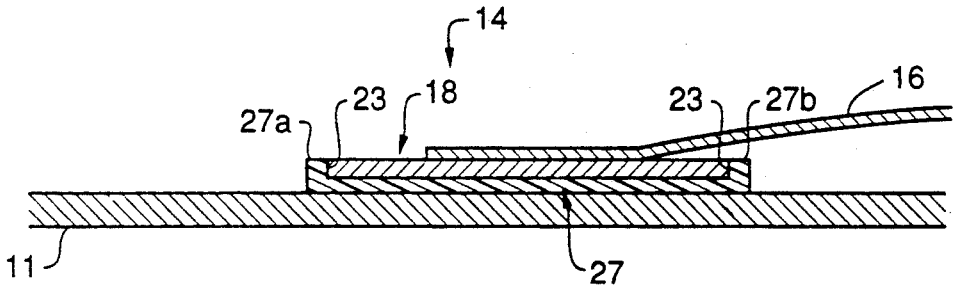
FIG. 7 is an enlarged cross-sectional view of the slit sleeve bearing and end band with bow spring attached taken along line 6—6 of FIG. 5.

A first alternative embodiment of the present invention is illustrated in FIGS. 5–9. In this embodiment, the fixed and slidable inner sleeves, 12*a* and 14*a* respectively, and the end caps 17 are eliminated. As best illustrated in FIG. 7, a sleeve bearing 27 with integral annular thrust bearings 27*a*, 27*b* serves as the only inner sleeve placed between each end band 18 and the casing 11. Preferably, the sleeve bearing 27 is comprised of a polymer such as PTFE, PE, polyurethane, or nylon. Eliminating the inner sleeves 12*a*, 14*a* and end caps 17 (see FIG. 2) reduces the cost of manufacturing and assembling the improved bow spring centralizer. Also, this embodiment allows the outer diameter of the end band 18 to be kept at a minimum. This benefit is particularly significant where the nominal clearance between the casing 11 and borehole wall (not shown) is small.

Referring to FIG. 7, the end band 18 is positioned between two annular thrust bearings 27*a*, 27*b* integrally formed with the sleeve bearing 27. These thrust bearings 27*a*, 27*b* should be designed so as to ensure that end bands 18 and their respective sleeve bearings 27 will longitudinally slide along the casing 11 as a unit. Preferably, the inner surface of end band 18 is polished or coated with a friction reducing material so that rotation occurs between the outer surface of the sleeve bearing 27 and the inner surface of the end band 18 in order to ensure even wear of the entire bearing surface. Alternatively or additionally, a friction increasing material may be coated either on the inner surface of sleeve bearing 27 or the outer surface of casing 11 to ensure that sleeve bearing 27 and casing 11 rotate as a unit. Naturally, these surfaces also may be abraded, rather than coated with a friction increasing material, to enhance the coefficient of friction at their interface.

The rotation of the sleeve bearing 27 as a unit with the casing 11 promotes uniform wear about the outer surface of the sleeve bearing 27, especially in a horizontal or deviated wellbore. This in turn eliminates localized wear. Localized wear typically occurs where the casing 11 rotates inside a stationary sleeve bearing. Such rotation may place more pressure on one portion of the sleeve bearing than another portion. Mitigating the localized wear effect usually requires greater thickness in the sleeve bearing material because only a portion of the available bearing surface is being utilized. Greater material thickness may not be a practical solution, however, where the nominal clearance between the casing 11 and borehole wall (not shown) is small.

Figure 8:
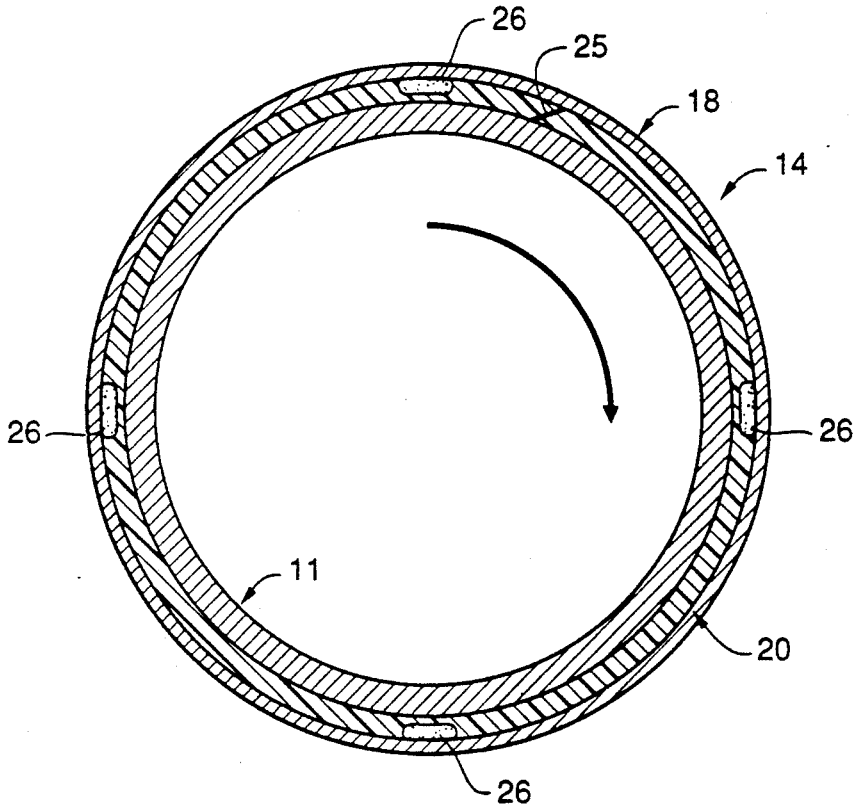
FIG. 8 is a cross-sectional view of the slit sleeve bearing and end band taken along line 8—8 of FIG. 5 and illustrating the use of mud grooves in the sleeve bearing.
Figure 9:
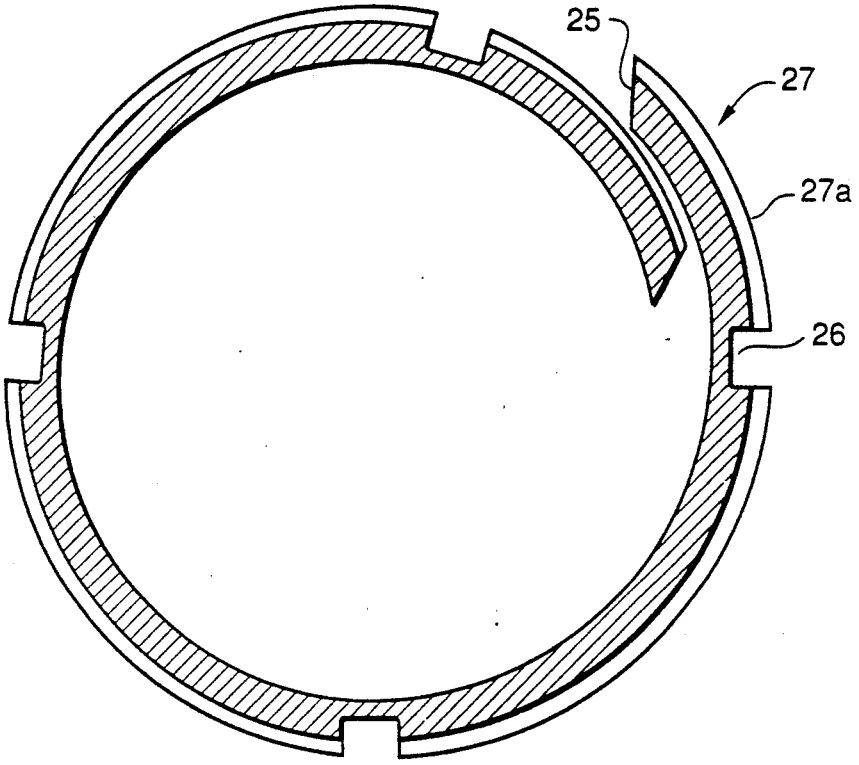
FIG. 9 is a cross-sectional view of the slit sleeve bearing illustrating its curled position.

FIG. 7 depicts a slidable sleeve 14 which may move longitudinally along casing 11. As shown in FIGS. 5 and 6, both the sleeve assemblies 14 are constructed identically and are longitudinally slidable. Longitudinal movement of the centralizer 10 may be restricted with stop collars 19 fixed on the outside of each sleeve 14 by set screws 21. Alternatively, stop collars 19 may be located on both the inboard and outboard sides of either of the two sleeve assemblies 14 or a single stop collar 19 may be located between the two sleeve assemblies 14.

Where the sleeve bearing 27 has two integral thrust bearings 27*a*, 27*b*, as illustrated in FIG. 7, it may be difficult to insert the sleeve bearing 27 into the end band 18. FIGS. 8 and 9 illustrate a "scarf cut" or slit 25 which allows the sleeve bearing 27 to be temporarily curled to a reduced diameter. As a result, such a sleeve bearing 27 may be easily fitted into the end band 18.

As more fully described above, a plurality of mud grooves 26 may be used to protect the bearing surfaces and thereby facilitate rotation between the outer surface of sleeve bearing 27 and the inner surface of end band 18. As illustrated in FIGS. 8 and 9, these mud grooves 26 should be located in the outer surface of a sleeve bearing 27 which is designed to rotate as a unit with casing 11.

Another modification (not shown) to the first alternative embodiment includes substituting detached thrust bearings 22 for integral thrust bearings 27*a*, 27*b*. Of course, a detached thrust bearing 22 would be required between the sleeve assembly 14 and any stop collar 19, used to limit the longitudinal movement of end band 18. A natural advantage to this modification is that it would not require a slit 25 to facilitate fitting sleeve bearing 27 into end band 18.

Figure 10:
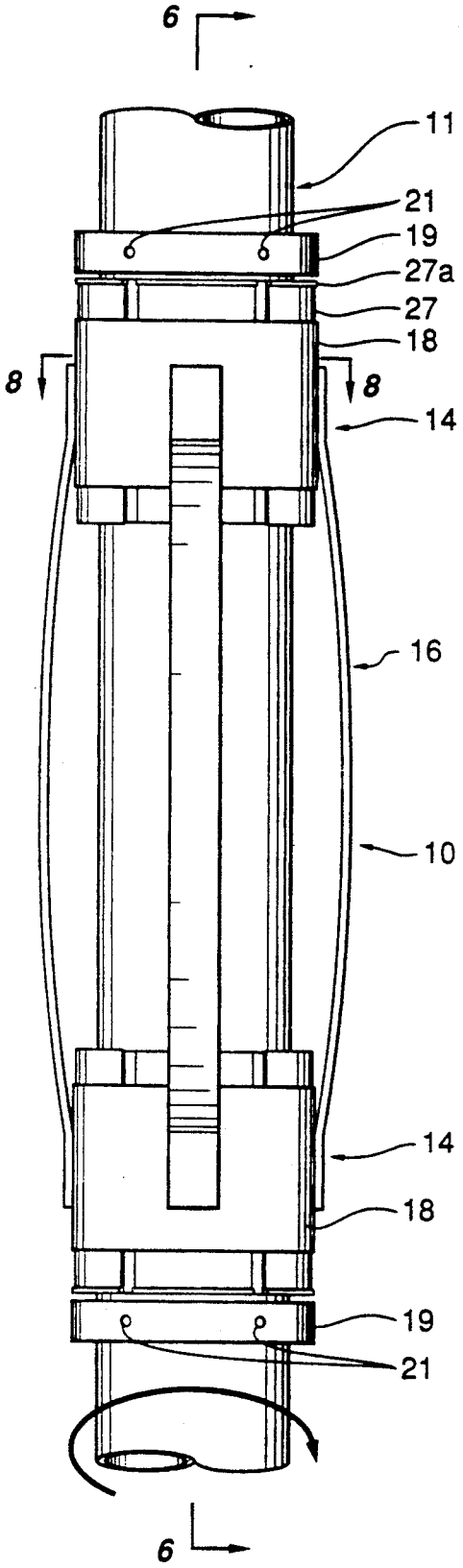
FIG. 10 illustrates a second alternative embodiment of the improved bow spring type centralizer having extended length sleeve bearings.

A second alternative embodiment of the invention is illustrated in FIG. 10. This embodiment uses an adhesive or other means for attaching sleeve bearing 27 to casing 11. The adhesive would be placed between the outer surface of casing 11 and inner surface of sleeve bearing 27. As illustrated in FIG. 10, such an embodiment would require sleeve bearings having greater length than their respective end bands 18. Such extended sleeve bearings 27 provide the additional bearing surface needed to accommodate longitudinal movement of the end bands 18 caused by flexing of the bow springs 16.

A modification to this embodiment (not shown) would use a single extended length sleeve bearing 27 for the end band 18 which is free to move longitudinally. However, the opposing end band 18 would not require an extended length sleeve bearing 27 since its longitudinal movement would be restricted by two stop collars 19, one inboard and the other outboard.

Another modification (not shown) to the second alternative embodiment includes attaching sleeve bearing 27 to stop collar 19. This modification thereby eliminates the need for an adhesive to attach sleeve bearing 27 to casing 11. Sleeve bearing 27 may be attached to stop collar 19 by rigidly clamping the stop collar 19 over the thrust bearing 27*a* or integrally binding sleeve bearing 27 with stop collar 19 using screw or adhesive means.

For the second alternative embodiment shown in FIG. 10 each extended sleeve bearing requires only one integral thrust bearing 27*a* to reduce potential frictional loads acting on the edge of its end band 18. The single integral thrust bearing 27*a* is located on the outboard end of each sleeve bearing 27. A stop collar 19 outboard of each end band 18, will ensure that neither end band 18 slides off its respective sleeve bearing 27. As discussed above, this embodiment may also be achieved using a detached thrust bearing 22 rather than an integral thrust bearing 27*a*.

Figure 11:
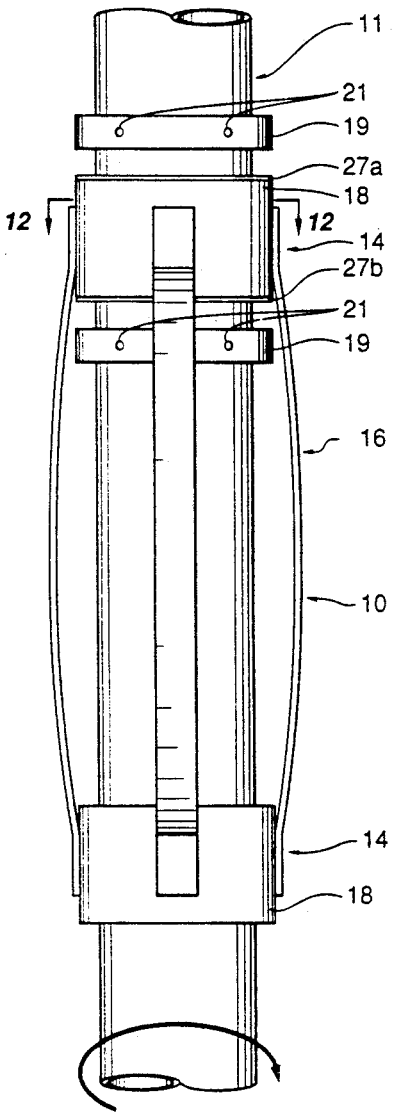
FIG. 11 illustrates a third alternative embodiment of the improved bow spring type centralizer in which the sleeve bearings are attached to the centralizer's end bands.
Figure 12:
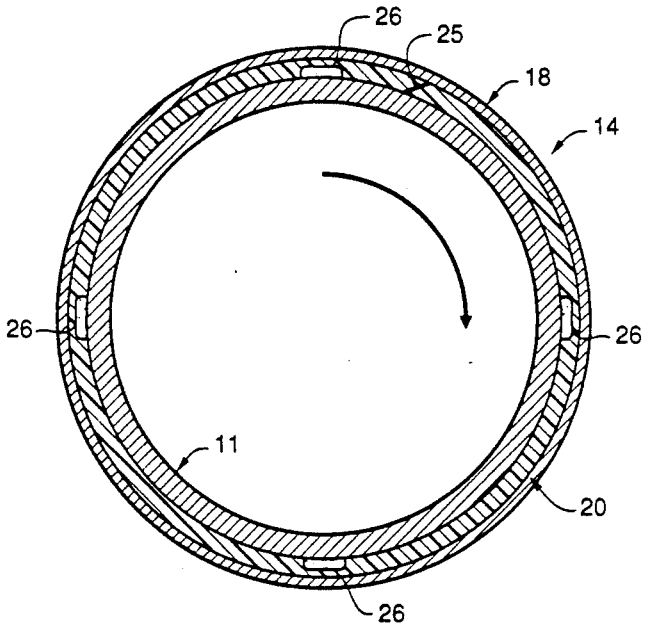
FIG. 12 is a cross-sectional view of the sleeve bearing and end band taken along line 12—12 of FIG. 11.

A third alternative embodiment having each sleeve bearing 27 attached to its respective end band 18 is illustrated in FIGS. 11 and 12. Such attachment may be accomplished by placing an adhesive, appropriate for adhering a polymer to steel, between the sleeve bearing 27 and end band 18. Other attachment means known to those skilled in the art may also be employed. Of course, with this embodiment rotation occurs between the inner surface of sleeve bearing 27 and casing 11. Consequently, the mud grooves 26 must be placed in the inner surface of sleeve bearing 27 to be useful in protecting that surface from deterioration by various particles and debris mixed with the drilling fluid.

This embodiment may be preferable under certain circumstances. One such circumstance would be where there is a large nominal clearance between the casing 11 and borehole wall (not shown). Consequently, the sleeve bearing's thickness may be increased to mitigate the localized wear effect described above. Alternatively, where the nominal casing-to-borehole wall clearance remains small the sleeve bearing may be constructed from a wear resistant material to enhance its resistance to the localized wear effect.

FIG. 11 illustrates one of several configurations possible with the third alternative embodiment. As shown two stop collars 19, one inboard and the other outboard, are placed adjacent to a single end band 18. Another two collar configuration (not shown) would position one collar 19 outboard with respect to each end band 18. A third configuration (not shown) would place a single collar 19 between the two end bands 18. In each of these configurations the collar 19 may be attached to casing 11 using set screws 21.

As seen in FIG. 11 thrust bearings 27*a*, 27*b* are required to reduce frictional forces arising from contact between the end band 18 and its respective stop collars 19. A modification of this embodiment (not shown) would use detached thrust bearings 22 instead of integral thrust bearings 27*a*, 27*b*. Naturally, the other collar configurations described for this embodiment would require either integral thrust bearings 27*a*, 27*b* or detached thrust bearings 22 where contact between stop collar 19 and end band 18 may occur. Such thrust bearings 27*a*, 27*b* or 22 would be positioned between the stop collar 19 and its respective end band 18. A slit or scarf cut 25 is also required where the sleeve bearing 27 has two integral thrust bearings 27*a*, 27*b* formed into each end.

The preferred embodiments and mode of practicing the invention have been described. It is to be understood that the foregoing is illustrative only and that other means and techniques can be employed without departing from the true scope of the invention defined in the following claims.

What is claimed is:

1. A device for substantially centering a pipe in a borehole, comprising;

a) first and second sleeve bearings circumscribing said pipe, each of said sleeve bearings being generally tubular and having an inner cylindrical surface and an outer cylindrical surface, the diameter of said inner cylindrical surface being substantially equal to the outer diameter of said pipe;

b) a bow spring section having (i) first and second end bands circumscribing said first and second sleeve bearings, respectively, each of said end bands being generally tubular and having an inner cylindrical surface, the diameter of said inner cylindrical surface of said end band being substantially equal to the diameter of said outer cylindrical surface of said sleeve bearing, and (ii) a plurality of longitudinal bow springs spaced around said pipe, each of said bow springs being attached at one end to said first end band and at the other end to said second end band and being formed in an outwardly bowed arc so as to contact the wall of said wellbore at or near the center of its span;

c) said sleeve bearings and said end bands being fabricated and assembled so that upon rotation of said pipe said sleeve bearings rotate substantially with said pipe while said end bands remain substantially stationary.

2. The device of claim 1 wherein said inner cylindrical surface of each of said end bands is polished so as to reduce the frictional forces between said inner cylindrical surface and said outer cylindrical surface of said sleeve bearing.

3. The device of claim 1 wherein said inner cylindrical surface of each of said end bands is coated with a friction-reducing material so as to reduce the frictional forces between said inner cylindrical surface and the outer cylindrical surface of said sleeve bearing.

4. The device of claim 1 wherein said inner cylindrical surface of each of said sleeve bearings is coated with a friction-increasing material so as to increase the frictional forces between said inner cylindrical surface and the outer surface of said pipe.

5. The device of claim 1 wherein said sleeve bearings have a plurality of longitudinal mud grooves spaced around the outer cylindrical surfaces of said sleeve bearings.

6. The device of claim 1 wherein said sleeve bearings are comprised of polytetrafluoreothylene.

7. The device of claim 1 wherein said sleeve bearings are comprised polyethylene.

8. The device of claim 1 wherein said sleeve bearings are comprised of polyurethane.

9. The device of claim 1 wherein said sleeve bearings are comprised of nylon.

10. The device of claim 1 wherein said device further comprises two stop collars attached to and circumscribing said pipe and wherein the length of each of said sleeve bearings is greater than the length of its respective end band, each of said sleeve bearings being attached at one of its ends to one of said stop collars to ensure that said sleeve bearing rotates as a unit with said pipe.

11. The device of claim 1 wherein an adhesive is placed between the outer surface of said pipe and the inner cylindrical surfaces of said sleeve bearings so that said pipe and said sleeve bearings rotate as a unit.

12. The device of claim 11 wherein the length of each of said sleeve bearings is greater than the length of its respective end band.

13. The device of claim 1 wherein each of said sleeve bearings further comprise two annular thrust bearings integrally formed with said sleeve bearing so as to ensure that said end band and said sleeve bearing move longitudinally along said pipe as a unit.

14. The device of claim 13 wherein each of said sleeve bearings has a longitudinal slit allowing each of said sleeve bearings to be temporarily curled to a reduced diameter for insertion into said end band.

15. A device for substantially centering a pipe in a borehole, comprising;

a) first and second sleeve bearings circumscribing said pipe, each of said sleeve bearings being generally tubular and having an inner cylindrical surface and an outer cylindrical surface, the diameter of said inner cylindrical surface being substantially equal to the outer diameter of said pipe;

b) a bow spring section having (i) first and second end bands circumscribing said first and second sleeve bearings, respectively, each of said end bands being generally tubular and having an inner cylindrical surface, the diameter of said inner cylindrical surface of said end band being substantially equal to the diameter of said outer cylindrical surface of said sleeve bearing, and (ii) a plurality of longitudinal bow springs spaced around said pipe, each of said bow springs being attached at one end to said first end band and at the other end to said second end band and being formed in an outwardly bowed arc so as to contact the wall of said wellbore at or near the center of its span;

c) each of said sleeve bearings having a plurality of longitudinal mud grooves spaced around the inner cylindrical surface of said sleeve bearing and each of said sleeve bearings being attached to the inner cylindrical surface of its respective end band.

16. The device of claim 15 wherein said sleeve bearings are comprised of polytetrafluoreothylene.

17. The device of claim 15 wherein said sleeve bearings are comprised of polyethylene.

18. The device of claim 15 wherein said sleeve bearings are comprised of polyurethane.

19. The device of claim 15 wherein said sleeve bearings are comprised of nylon.

20. The device of claim 15 wherein each of said sleeve bearings further comprise two annular thrust bearings integrally formed with said sleeve bearings.

21. The device of claim 20 wherein each of said sleeve bearings has a longitudinal slit allowing said sleeve bearing to be temporarily curled to a reduced diameter for insertion into said end band.

* * * * *